2 Sheets—Sheet 1.

S. J. & C. WEICKEL.
Corn-Planter and Seed-Drill.

No. 199,127. Patented Jan. 8, 1878.

WITNESSES:
INVENTORS.

2 Sheets—Sheet 2.

S. J. & C. WEICKEL.
Corn-Planter and Seed-Drill.

No. 199,127. Patented Jan. 8, 1878.

WITNESSES.
J. Wm Garner
F. M. Burnham

INVENTORS.
S. J. Weickle
Chas. Weickle
per
F. A. Lehmann, Atty.

UNITED STATES PATENT OFFICE.

SIMON J. WEICKEL AND CHARLES WEICKEL, OF LACLEDE, MISSOURI.

IMPROVEMENT IN CORN-PLANTER AND SEED-DRILL.

Specification forming part of Letters Patent No. 199,127, dated January 8, 1878; application filed September 10, 1877.

*To all whom it may concern:*

Be it known that we, SIMON J. WEICKEL and CHAS. WEICKEL, of Laclede, in the county of Linn and State of Missouri, have invented certain new and useful Improvements in Corn-Planter and Seed-Drill; and we do hereby declare the following to be a full, clear, and exact description of the invention, such as will enable others skilled in the art to which it pertains to make and use it, reference being had to the accompanying drawings, which form part of this specification.

The nature of our invention consists in the construction and arrangement of a combined seed drill and planter, as will be hereinafter more fully set forth.

Figure 1:
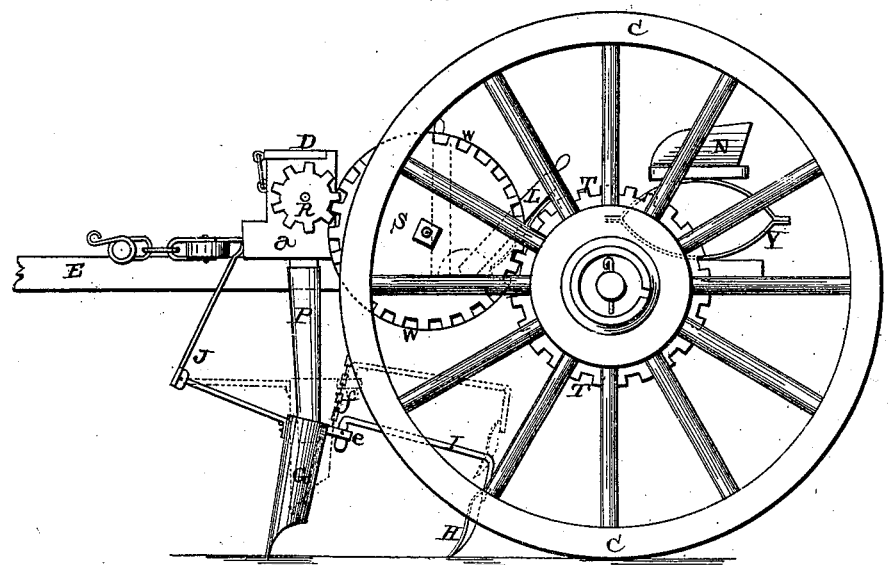
Figure 2:
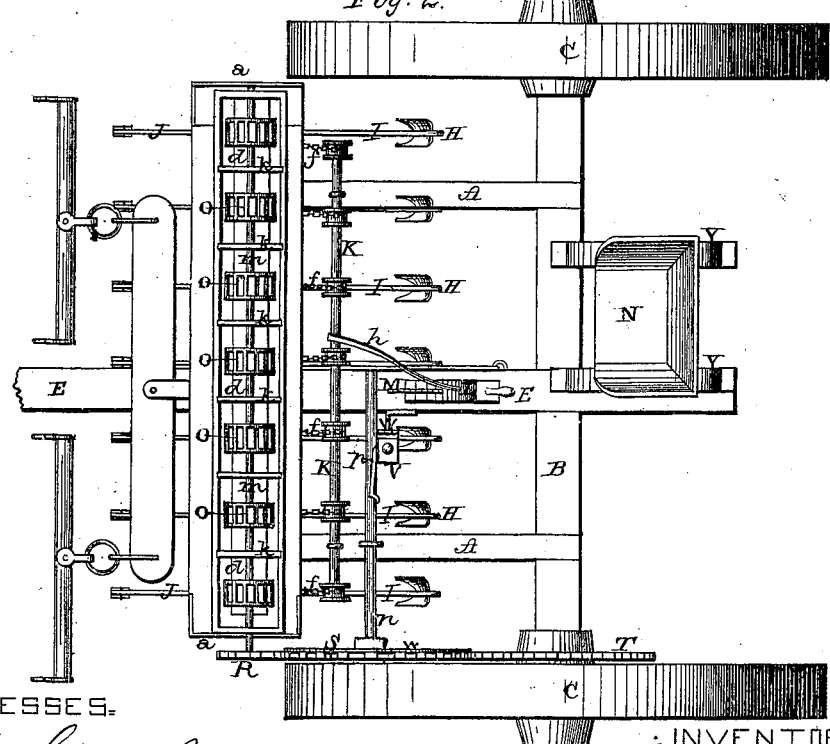
Figure 3:
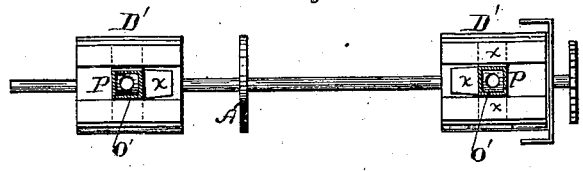
Figure 4:
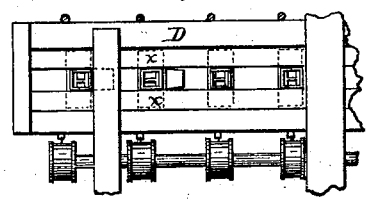

Figure 1 is a side elevation, and Fig. 2 a plan view, of our invention. Figs. 3 and 4 are detail views of the same.

A represents the frame of our machine, secured to the axle B, which has a driving-wheel, C, on each end. In the center of the frame A is the tongue E, secured thereto and to the axle. D is the seed-box, fastened on the front end of the frame A by means of plates $a\ a$ at the ends. In the bottom of the drill-box is a movable slide, $d$, operated by a handle from underneath, which slide is moved to the right to open and to the left to close the feed. By this means the operator can regulate the feed to as much or little as he may desire without changing any wheels, and while the machine is in motion; or, if he chooses, he can shut off the feed entirely.

We have shown this as a seven-fluke drill; but it can be made with any number of flukes desired. G G represent the flukes of ordinary construction, and to each fluke is connected a shovel, H, by means of a rod, I. This shovel is cut concave, with two side prongs and a center opening, as shown, and is intended to follow the fluke and cover up the grain, thus leaving a ridge where the grain is put, with a ditch on either side for the water to run off, thereby more effectually preventing it from rotting or freezing out. The connecting-rod I is bent at both ends, and has several holes for bolting to the fluke and shovel, so that the shovel may be raised and lowered independent of the fluke. At the upper end of the fluke, on the back, is a socket, $e$, in which to fasten the shovel-rod I.

Each fluke is attached to the frame by a jointed rod, J, making a neat compact frame, letting the whole weight of both shovel and fluke into the ground. The jointed rod J is squared at the upper end where it enters the frame, and is to have nuts above and below the frame, thus preventing it from slipping around.

This machine is provided with a hoisting-roller, K, for the purpose of raising or lowering the flukes and shovels. This roller is provided with hooks, in which the straps or chains $f\ f$ are fastened that connect with the flukes. The flukes can also be raised or lowered by taking up or dropping a link. Around the hoisting-roller K is wound a strap, $h$, one end thereof being fastened to the roller, and the other end fastened to a spring-lever, L, that works in a half-ratchet wheel, M, fastened on the tongue E directly in front of the driver's seat N. The advantage of this device is that even a young boy can easily raise the whole set of flukes and shovels at once when passing over any obstruction.

The drill-box D is, by partitions $k$, divided into the proper number of compartments. These partitions are in halves, the upper half being movable, so as to be taken out at any time. The drill-feeders O consist of round cast-iron rollers, left high on either side in the form of a rim, with partitions at equal distances around the circumference of the wheel, of the same height as the rim, thus making it in the form of little boxes to carry the seed to the spouts P. These rollers or wheels O fit closely on the slide $d$ in the bottom of the drill-box, directly over the holes leading to the spouts, thus making it in reality a force-feed.

$m$ is a rod that goes through the drill-box, and is to pass through all the feed-wheels, which are to be tightened by nuts on both sides screwed on the rod, which also makes them easy to take out, when desired. On one end of the feed-rod $m$ is a cog-wheel, R, connected through an idle cog-wheel, S, with a similar wheel, T, fastened on the inner side of the driving-wheel C on that side of the machine. The wheels S and T are of the same size, and the wheel S is movable for the purpose of throwing the machine in and out of gear. The wheel S is placed loosely on a shaft, $n$, and this shaft is, by a rod, $p$, connected with a spring-lever, V, which works in a ratchet-wheel, W. On the side of the tongue E is fastened a spring, $v$, which pushes on the end of the shaft $n$, and helps to put it in motion, and also to hold it to its place. The loose wheel S is held on its shaft by two nuts, and is constructed with a rim, $w$, on one side, of the same height as the cogs, as a help to keep it from running out. By these means the machinery can be thrown in or out of gear in a second's time, and while the machine is in motion, thus bringing the machine entirely under the control of the operator in case of turning at the ends, or in driving over ground that he does not wish to sow or plant.

The drill-box D has suitable guides or ways on its under side for sliding out and in the spouts or rubber pipes P. Two of these spouts have an ear, $x$, on one end, as well as on the sides, for use on the planter attachment.

The seat N is supported upon springs Y Y, which are to be movable backward and forward, so as to cause the weight of the driver to balance the drill-box and frame.

The planter attachment consists of two boxes, D' D', having each a feeder, O', which is to be round cast-iron or rubber rollers, with two holes or boxes directly opposite each other, cast in the surface or circumference of the wheel, large enough to hold a feed of corn or beans. With both the holes open it will plant two feet apart, and by inserting a plug in one of the holes it will plant four feet apart, the feed-wheels having just one-third as many cogs as the others, thus planting perfectly straight both ways without the aid of a check-line or marker, and without the trouble of setting stakes.

The feeders O' are fastened on a rod, $m'$, in the same manner as described for the drill-feeders. These feeders carry the corn through the boxes into the spouts, thus making it a perfect force-feed. The boxes D' have guides or ways in which to slide the spouts P, which have the ears $x$, as above described. These two spouts can then be moved so that the ears $x$ will cover the holes in the planter-boxes, which can be done while the machine is in motion. The object of this is that one row at a time can be planted without stopping the motion of the machine, or without interfering with the planting of the other row.

Between the two corn-boxes there is a small cast-iron wheel, A', with spokes, attached to the rod $m'$. If desirable, a lever can be attached to these spokes, and the planter worked by hand.

To change from a drill to a planter, loosen the plates $a$ and remove the drill-box, also all the flukes except the second and sixth. The two spouts P with ears $x$ are taken out and placed under the corn-planter boxes. These boxes are then placed in the same place where the drill-box was, and fastened in the same manner.

Having thus fully described our invention, what we claim as new, and desire to secure by Letters Patent, is—

1. The combination of the fluke G, provided with the socket $e$, the bent adjustable connecting-rod I, and the adjustable pronged shovel H, as and for the purposes herein set forth.

2. The spouts P, provided with side ears or flanges, and sliding in guides or ways under the drill-box, as herein set forth.

In testimony that we claim the foregoing we have hereunto set our hands this 31st day of July, 1876.

SIMON J. WEICKEL.
CHARLES WEICKEL.

Witnesses:
JACOB H. SLINGSLAID,
THOS. E. FOREMAN.